(12) United States Patent
Smith et al.

(10) Patent No.: US 7,489,642 B2
(45) Date of Patent: Feb. 10, 2009

(54) SILENT DATAPATH FAILURE DETECTION

(75) Inventors: Desmond Glenn Smith, Kanata (CA); Terrence Vincent Sellars, Kanata (CA); Stephen Michael Shortt, Carp (CA); David Henry Graham, Kanata (CA); Christopher Edward Trader, Ottawa (CA); Myles Kevin Dear, Nepean (CA); Thomas Man Chun Kam, Stittsville (CA)

(73) Assignee: Alcatel Lucent, Paris (FR)

( * ) Notice: Subject to any disclaimer, the term of this patent is extended or adjusted under 35 U.S.C. 154(b) by 724 days.

(21) Appl. No.: 10/834,129

(22) Filed: Apr. 29, 2004

(65) Prior Publication Data

US 2005/0243731 A1 Nov. 3, 2005

(51) Int. Cl.
*H04L 12/26* (2006.01)
(52) U.S. Cl. .................................. 370/242; 370/252
(58) Field of Classification Search ............... None
See application file for complete search history.

(56) References Cited

U.S. PATENT DOCUMENTS

| | | | |
|---|---|---|---|
| 5,394,408 A * | 2/1995 | Nishihara et al. .......... 714/812 |
| 6,144,636 A * | 11/2000 | Aimoto et al. ............. 370/229 |
| 6,363,056 B1 * | 3/2002 | Beigi et al. ................. 370/252 |
| 6,763,024 B1 | 7/2004 | Law et al. |
| 6,831,890 B1 * | 12/2004 | Davis et al. ................. 370/229 |
| 2004/0037277 A1 * | 2/2004 | Mathews et al. ............ 370/386 |

* cited by examiner

Primary Examiner—Firmin Backer
Assistant Examiner—Rhonda Murphy

(57) ABSTRACT

The apparatus and method herein provide a means for actively monitoring a communications node for datapath disruptions caused within the node. It was developed to address linecard failures that were detected in the field and for which traditional error detection mechanisms such as CRC and OAM CC checks are not feasible. According to one implementation, statistics are collected over a preset time interval. If any egress cell counts are zero over a full interval, then the ingress interface for that datapath is determined, e.g. using the node's cross-datapath information, and the corresponding linecard of that ingress interface is contacted to determine the ingress cell count. If the ingress cell count is non-zero then the datapath is alarmed since the complete lack of cells transmitted at the egress indicates a datapath disruption. Other implementations that can detect datapath disruptions without a complete interval of statistics collection and which do not require a zero egress cell count are possible for cases where congestion, linecard resets, etc. can be ruled out.

39 Claims, 3 Drawing Sheets

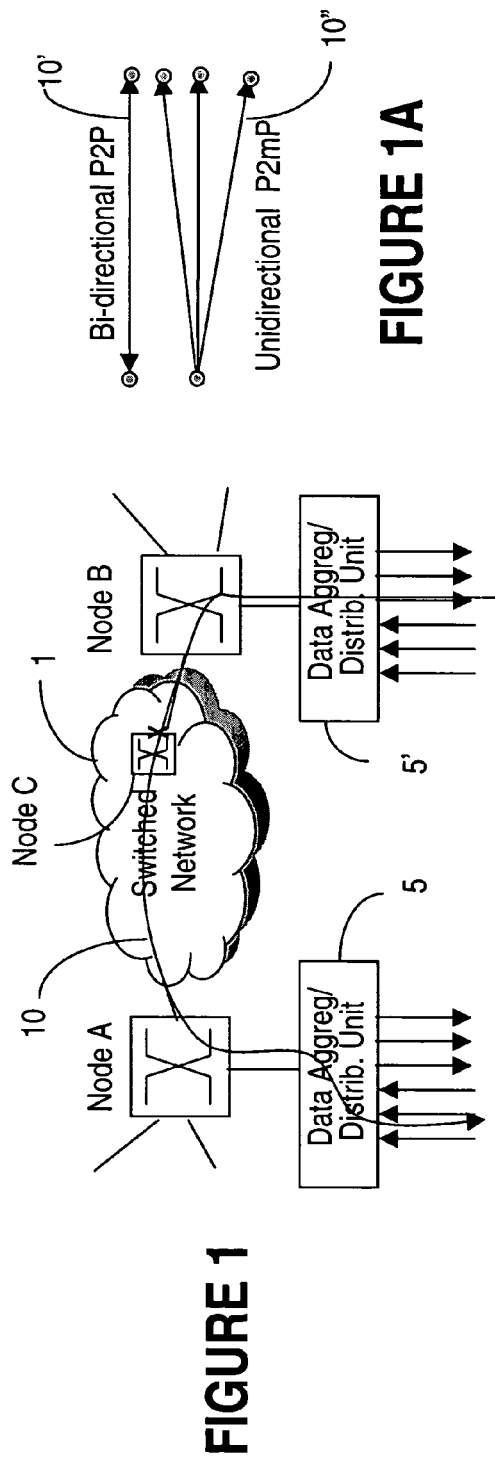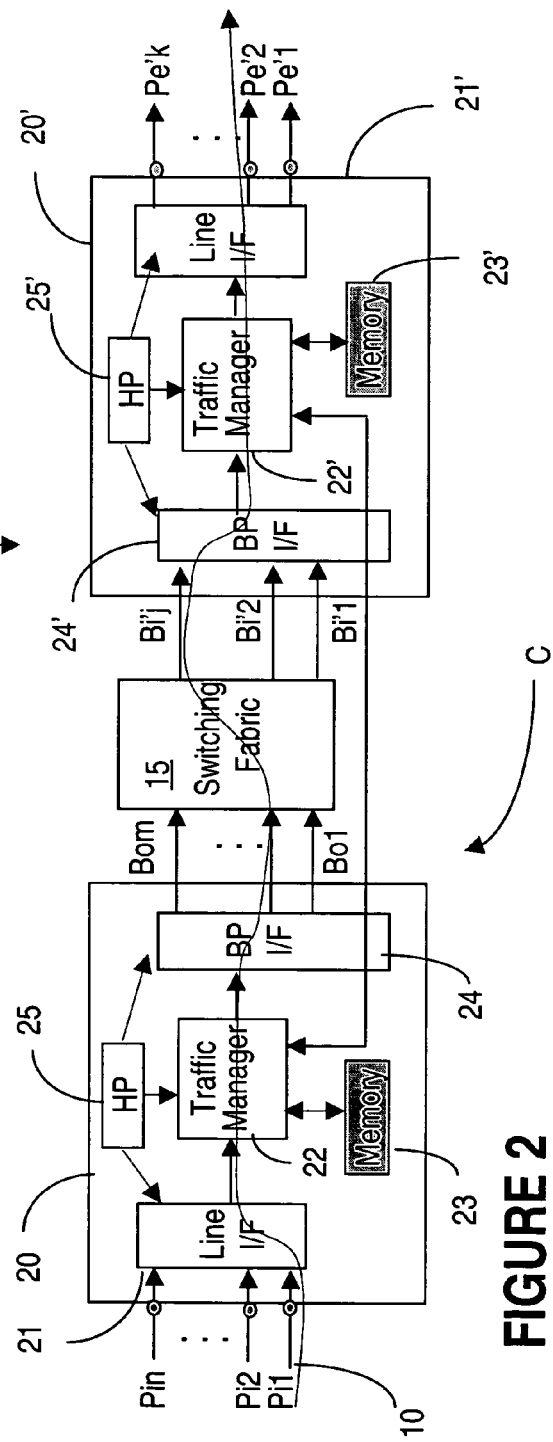
FIGURE 1
FIGURE 1A
FIGURE 2

SILENT DATAPATH FAILURE DETECTION

FIELD OF THE INVENTION

The invention is directed to communication networks and in particular to an apparatus and method for detection of silent datapath failures.

BACKGROUND OF THE INVENTION

Generally speaking, detection and isolation of connectivity loss is much more difficult to identify than is detection of transmission protocol data units (PDU) corruption. This is because a corrupted PDU is typically available for inspection and analysis, while detection of datapath interruption requires analysis of the PDU stream, rather than individual PDU's.

Thus, most transmission protocols associate a CRC (Cyclic Redundancy check) to each PDU, which is computed by applying a predetermined function to a block of data to be transmitted. The receiver at the far-end of the datapath recalculates the CRC using the same function as at transmission and compares the transmitted and received CRC. The corrupted bits are detected and may then be corrected using the CRC bits.

It is known to use OAM-CC cells to monitor for an end-to-end datapath connectivity in ATM networks. An OAM (operation, administration and maintenance) cell is a specially tagged ATM cell specified to support ATM network maintenance features like connectivity verification, alarm surveillance, continuity check, and performance monitoring. However, OAM-CC is not supported by all network equipment makes (network equipment supliers). In addition, the operational impact of configuring and monitoring large networks with thousands of connections becomes significant. Also, although OAM-CC can detect a datapath issue, it cannot isolate the cause (node, card) and therefore fails to reduce the fault isolation time and any related revenue loss issues. For these reasons, this solution is declined by many network customers.

Another conventional solution for datapath fault detection includes measuring the traffic at each node along the datapath using customized, off-line testers. These testers generally provide counters at ingress and egress ends of the datapath for counting the number of PDUs traversing these ends. The values of the counters over a preset period of time are compared to determine if cell loss or cell addition has occurred at the respective node. However, since this tester is a stand-alone device, the traffic needs to be stopped during the measurement, thus adversely affecting subscriber services. Also, these measurements take place after an end-user complains to the service provider about a failure. These limitations make this type of conventional solution essentially incompatible with real-time background diagnostic monitoring of a datapath.

On-line counters may also be used, as described in the co-pending U.S. patent application Ser. No. 10/717,377, entitled "Method And Apparatus For Detection Of Transmission Unit Loss And/Or Replication", Steven Driediger et al. filed on 19 Nov. 2003, and assigned to Alcatel. According to the solution proposed in Driediger's et al. Patent Application, aggregate per connection coherent counters are kept on ingress and egress line cards and periodically compared. This mechanism requires bounded latency through the switch fabric but subtle traffic loss or replication is also detected. On the other hand, this method adds complexity to PDU latency measurements as the PDU's traverse the fabric. This is because it is difficult to accurately measure and track the PDU's since latency is continuously changing.

There is a need to provide a method and apparatus that enables fast datapath failure detection while leveraging the hardware infrastructure that most nodes already have.

SUMMARY OF THE INVENTION

It is an object of the invention to provide an apparatus and method for detection of silent datapath failures that alleviates totally or in part the drawbacks of the prior art datapath failure systems.

The invention is directed to a switched communication network that enables establishing a datapath over a switching node of the network. Namely, the invention provides an apparatus for silent datapath failure detection at the node comprising an ingress statistics unit for collecting an ingress protocol data unit (PDU) count over a time interval at an ingress port of the node associated with the datapath; an egress statistics unit for collecting an egress PDU count over the time interval at an egress node at the node associated with the datapath; means for comparing the ingress PDU count and the egress PDU count and generating an error signal in case of a mismatch between the ingress PDU count and the egress PDU count; and means for alarming the mismatch and specifying a type of datapath failure associated with the error signal.

According to another aspect of the invention, a traffic manager is provided at a switching node of such a communication network. The traffic manager comprises: means for determining an egress count including all egress traffic PDU's in the datapath counted at the egress port over a period of time; and means for comparing the egress count with an ingress count and generating an error signal in the case of a mismatch between the ingress count and the egress count, wherein the ingress count includes all ingress traffic PDU's in the datapath counted at the ingress port over the period of time.

According to still another aspect of the invention, a traffic manager is provided at a switching node of a communication network. The traffic manager comprises: means for determining an ingress count including all ingress traffic PDU's in the datapath counted at the ingress port over a period of time; and means for comparing the ingress count with an egress count and generating an error signal in the case of a mismatch between the ingress count and the egress count, wherein the egress count includes all egress traffic PDU's in the datapath counted at the egress port over the period of time.

A method for silent datapath failure detection is also provided for a switched communication network of the type that enables establishing a datapath over a switching node of the network. According to another aspect of the invention, the method includes the steps of: at an ingress port associated with the datapath, collecting an ingress PDU count over a time interval; at an egress port associated with the datapath, collecting an egress PDU count over the time interval; identifying the ingress port associated with the egress port whenever the egress PDU count violates a threshold; and comparing the ingress PDU count with the egress PDU count and generating an error signal in case of a mismatch between the ingress PDU count and the egress PDU count.

From the market perspective, node availability is a very important performance parameter of any telecommunication network. Advantageously, the apparatus and method of the invention enables a network provider to isolate the fault to a certain node, and to a certain pair of line cards without live traffic interruption. This improves the node availability by reducing the fault detection and isolation times, thereby reducing the node's mean time-to-repair (MTTR).

In addition, no special hardware is required for implementing the solution according to the invention. The fault detection time can be controlled by selecting the statistics collection time, so that fast detection may be obtained. Furthermore, the invention proposed herein does not consume any network bandwidth as for example the OAM-CC mechanism does.

BRIEF DESCRIPTION OF THE DRAWINGS

The foregoing and other objects, features and advantages of the invention will be apparent from the following more particular description of the preferred embodiments, as illustrated in the appended drawings, where:

FIG. 1 illustrates a datapath connecting two end-points over a switched network;

FIG. 1A shows the types of datapaths in a switched network;

FIG. 2 shows the datapath from an ingress port to an egress port at a node of a switched network according to an embodiment of the invention;

DETAILED DESCRIPTION

Figure 3A:
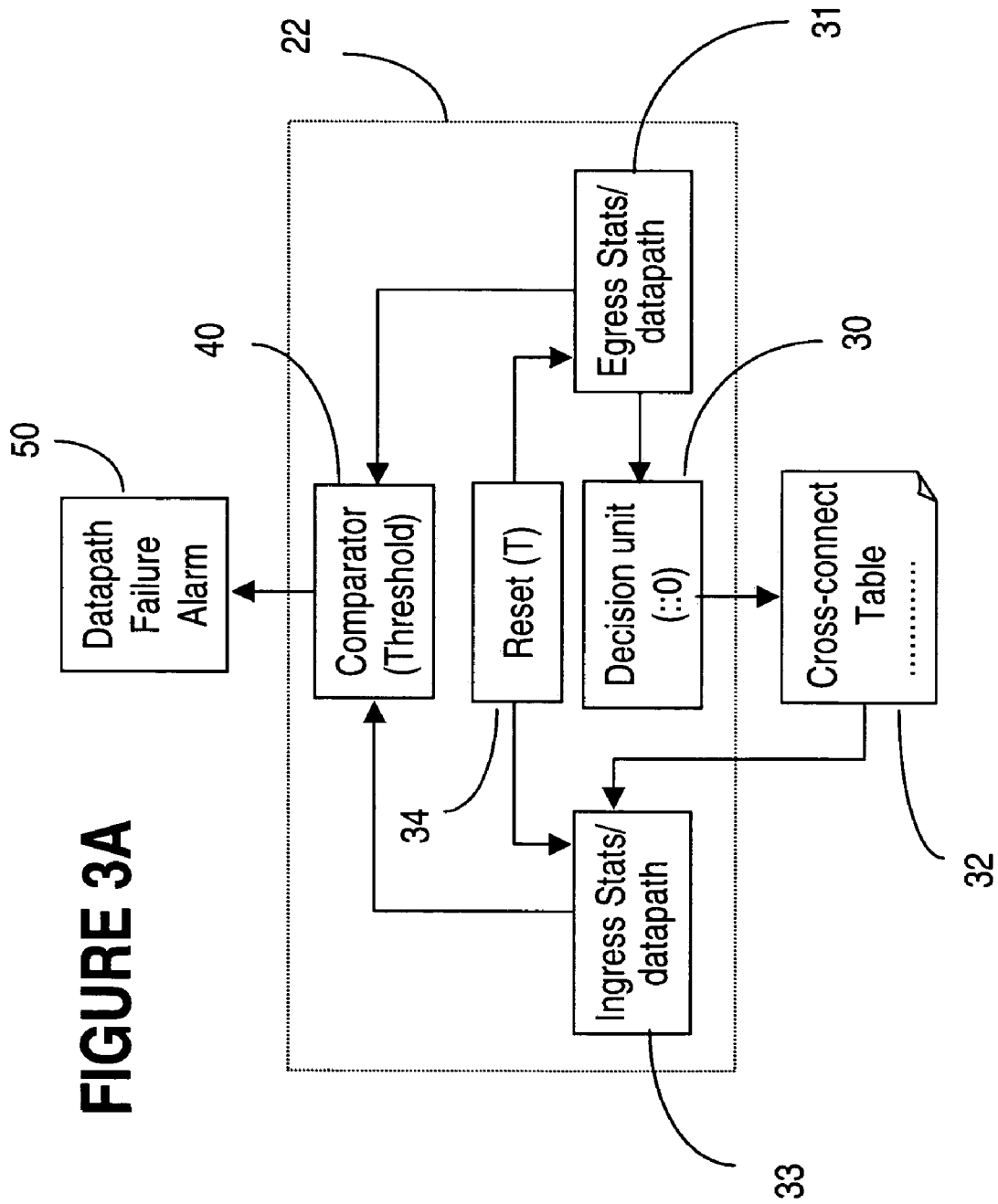
FIG. 3A illustrates a block diagram of the apparatus for detection of silent datapath failures according to the invention.

A silent failure is a disruption in a connection-oriented datapath that causes the datapath traffic to become unidirectional or to partially or completely stop flowing, and this is not detected except by the end-user.

The invention provides a means for actively monitoring a node of a communications network for silent datapath disruptions caused within the node. FIG. 1 illustrates a datapath 10 connecting two end-points over a switched network 1. In this example, a data aggregation unit 5 combines the traffic from a plurality of local users connected to node A and a data distribution unit 5' distributes the traffic received at node B over network 1 between a plurality of local users. The invention enables the network provider to detect linecard and switching fabric failures for which traditional error detection mechanisms such as CRC and OAM CC checks are not feasible. In this example, the invention enables locating the failure at node C and furthermore, enables locating the pair of cards at this node causing the failure.

It is to be noted here that datapath 10 may be a bidirectional point-to-point connection as shown at 10', or a unidirectional point-to-multipoint connection as shown at 10", as shown in FIG. 1A.

FIG. 2 shows the datapath from an ingress port to an egress port at node C of network 1 (see FIG. 1). More precisely, this figure illustrates a linecard 20, 20' and the switch fabric 15, which are the main elements along the datapath. The linecard is illustrated here as two distinct units 20, 20' one comprising the ingress (input) logic and the other, the egress (output) logic. Note that a datapath may use the ingress and egress logic of the same linecard, or of two distinct linecards.

Ingress logic 20 comprises in general terms a line interface 21, a traffic manager 22 with the associated memory 23, and a backplane interface 24. The line interface 21 on ingress logic 20 accommodates a plurality of ingress ports, such as ports Pi1 to Pin. Index 'i' indicates an ingress (input) port and "n" indicates the maximum number of ingress ports on the respective card.

Line interface 21 includes the line receivers for physically terminating the respective line. Interface 21 forwards the PDU's to traffic manager 22, illustrated in further details in FIG. 2. Traffic manager 22 examines the PDU header, verifies the header integrity and provides the PDU to the backplane interface 24 and the switching fabric 15.

Let us assume that network 1 is an ATM network; ATM is a transmission protocol based upon asynchronous time division multiplexing using fixed length protocol data units called cells. These cells typically have a length of 53 bytes (octets), each cell containing 48 octets of user data (payload) and 5 octets of network information (header). The header of a cell contains address information which allows the network to route the cell over the network from the entry point to the exit, and also includes error correction information. It is however to be understood that the invention is applicable to other types of connection-oriented services (Ethernet, MPLS, FR).

Generically, traffic manager 22 is responsible for extracting OAM (operation, administration and maintenance) cells and executing the operations required by these cells. Furthermore, traffic manager 22 calculates the local routing/switching information (fabric header) for the input cells so that they are routed correctly by the switching fabric. The fabric routing information is obtained based on the origin and destination address in the cell header and established using look-up tables in memory 23 (preferably a random addressable memory). In the case of an ATM cell, this fabric header is preferably 7 bytes long.

Traffic manager 22 may also provide cell header detection and correction via CRC checks. Most fault locations can be monitored using error detection (e.g. CRC); however corruption of preliminary header bytes at the line ingress interface remains at risk in many current implementations. For example, Alcatel's ATM line cards actually use a number of different devices (such as ATMC and ATLAS) for this functionality, which can come from different vendors, such as Motorola or PMC Sierra. It is apparent that a fault at the memory 23 cannot be detected by calculating the CRC at manager 22, since unit 22 performs the CRC on the header bits prior to buffering the cells in memory 23. This may result in errors in routing the PDU along the correct datapath 10.

The ingress logic 20 also interfaces with the switching fabric 15 over a backplane interface 24, as shown by links from unit 20 to fabric 15 denoted with Bo1-Bom. A housekeeping processor 25 is used for the general tasks enabling proper operation of the interfaces 21, 24 and manager 22.

At the egress side of the node, the links from fabric 15 to egress logic 20' are denoted with Bi'1-Bi'm. The traffic manager 22' performs similar tasks to the tasks performed by manager 22 on the PDU's received from the backplane interface 24', namely local traffic routing, policing, OAM insertion, stripping of the internal fabric header, and addition of CRC bytes to the cell header to enable downstream header corruption detection. Traffic manager 22' forwards the cells to the egress line interface 21' which then routes the cells to a transmitter corresponding to an appropriate egress port Pe'1-Pe'k for conveying the traffic to the next node, where index 'e' indicates an egress (output) port and "k" indicates the maximum number of output ports on the respective card. It is to be noted that the number of input ports on a card may differ from the number of output ports, and that two cards may have different numbers of such ports.

In this example, datapath 10 uses a point-to-point (P2P) bidirectional connection, only the forward direction being illustrated for simplification. The datapath 10 at node C runs in this example from ingress port Pi1 on ingress logic 20 over link Bo2 at the exit of backplane interface 24, is switched by fabric 15 from Bo2 on link Bi'j, and then routed from backplane interface 24' on egress port Pe'k. The term "backplane connection" is used herein for a trail from an exit pin on backplane interface 24, over fabric 15, to an input pin on backplane interface 24'.

According to a preferred embodiment of the invention, the traffic managers 22, 22' assume that every cell received by the switching node must egress the switch in the case of a P2P connection 10', or must be replicated in a case of a P2mP connection 10". Ideally, any cell which is originated and/or terminated within the node itself should be excluded from the endpoint statistics count. This includes the OAM cells inserted by the ingress card into the fabric, and extracted by the egress card. This also includes any cells sourced/terminated by the node and used for real-time flow control.

FIG. 3A illustrates a block diagram of the apparatus for detection of silent datapath failures according to the invention. As seen in FIG. 3A, ingress and egress traffic managers 22, 22' collect the respective ingress and egress statistics at the connection level, such as on datapath 10, as shown by blocks 31 and 33. As discussed above, the statistics are maintained on a per datapath basis and preferably refer only to the cells received at the input of the node and respectively transmitted at an output of the node (excluding any cells sourced/terminated by the node).

The statistics may be collected in the respective memory 23, 23' (see FIG. 2), or may use separate memory means. The statistics are collected over a preset period of time, denoted here with T, as shown by reset unit 34. If any egress cell count is zero over a full interval T, determined by a decision unit 30, then the ingress interface for that datapath is determined, using e.g. the node's cross-connection information 32. The corresponding linecard for that egress interface is contacted to determine the ingress cell count available at 33. It is to be noted that a variant where the comparison between the ingress and egress statistics is made continuously is also possible, in which case a decision unit 30 is not necessary.

There are current implementations where ingress and egress statistics are collected over a rather large time interval T (15 minutes). The present invention may use this existent feature. Alternatively, the present invention may use shorter intervals, in which case the statistics do not need to rely on an entire such interval. Using shorter intervals would enable faster alarming of datapath disruption errors.

If the ingress cell count is non-zero for an egress count of zero, as determined by a comparator 40, the datapath is alarmed as shown at 50, since the complete lack of cells transmitted at the egress indicates a datapath disruption. In this document, the phrase "non-zero count of ingress cells" should be taken to mean "enough ingress cells to allow at least one to reach the egress side, given maximum expected switch latency and max expected traffic rate of the datapath". If this threshold is too low, a datapath failure alarm could be erroneously raised when no such failure exists.

Figure 3B:
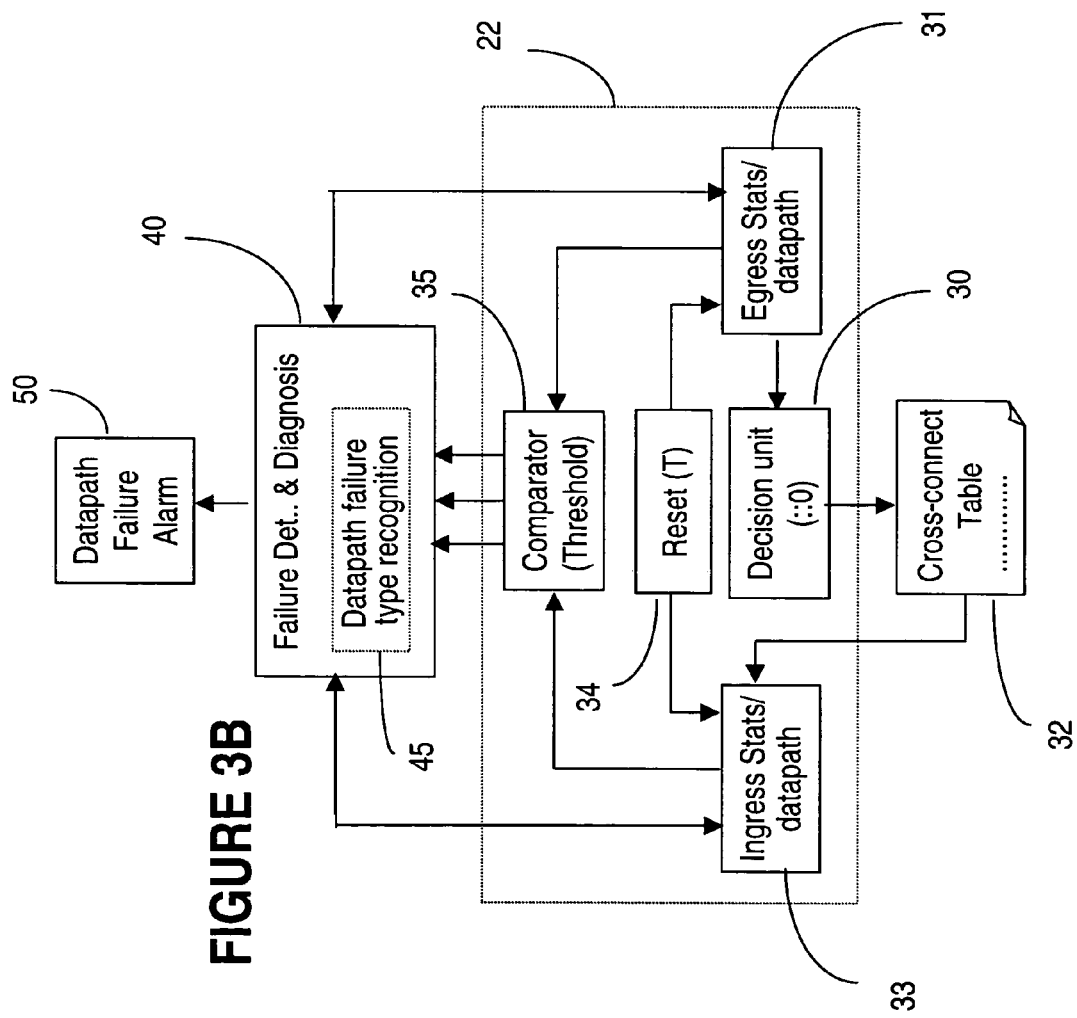
FIG. 3B illustrates a block diagram of a further embodiment of the apparatus for detection of silent datapath failures according to the invention.

In a more sophisticated variant of the invention, shown in FIG. 3B, the comparator 40 uses a plurality of thresholds rather than just one "zero" threshold, in order to rule out cases of congestion, linecard resets, etc. The thresholds may be determined based on experiments and may be provided for various states of operation for the respective node or datapath. The result of the comparison against the respective threshold is sent to the node controller, where a failure detection and diagnosis unit 40 establishes the cause of the discrepancy between the ingress and egress statistics. The datapath is alarmed as shown at 50 only if the valid cases of discrepancies were eliminated. In addition, the decision unit 30 could employ an egress statistics threshold to decide whether or not the datapath is suspected of traffic failure, instead of checking for non-zero egress statistics.

For example, a discrepancy between mating ingress and egress cell counts of a datapath could be alarmed if congestion could be discounted as the cause (e.g. CBR or high priority connections) and the discrepancy was substantial, the determination of which would depend on the connection's bandwidth. That is, the egress cell count is not zero because the datapath disruption occurred partway through the interval. In other cases, a datapath alarm could be inhibited if a zero count of egress cells and a non-zero count of ingress cells over a partial interval are observed, and the shortened interval was due to a verifiable card reset, or creation of the connection. In some cases, another interval of statistics may be required before a determination whether to alarm a datapath or not is made.

Preferably, failure detection and diagnosis unit 40, which monitors the ingress/egress statistics, may be provided with additional means for detecting the type of datapath failure, as shown in dotted lines at 45. Unit 45 enables the operator to distinguish the failure type by providing specific messages for various types of silent datapath failures. For example, unit 45 enables the operator to recognize an eventual corruption of the ingress or/and egress statistics being stored in memory 23, 23'. This occurrence, even if atypical, will result in a small number of cases where an alarm may be raised when no traffic loss is occurring, or may be not raised when real traffic loss is occurring. In this situation, unit 45 provides a specific alarm message to the operator indicating that the alarm was raised by a statistics corruption.

Still further, datapath failure type recognition unit 45 may use the failure data to trigger automatic recovery of the datapath, such as local connection repair, or connection re-route (if the connection is switched).

In the broadest sense, ingress and egress cell count statistics are collected periodically on connections provided by the node. When a datapath's mating pair of ingress and egress statistics are substantially mismatched in a way that can not be explained by verifiable normal behavior of the node or traffic affecting fault conditions for which alarms have already been raised, then the datapath is alarmed at 50.

We claim:

1. In a switched communication network that enables establishing a datapath over a switching node of said network, an apparatus for silent datapath failure detection at said node comprising:
   at an ingress of said node associated with said datapath, an ingress statistics unit for collecting an ingress protocol data unit (PDU) count over a time interval;
   at an egress of said node associated with said datapath, an egress statistics unit for collecting an egress PDU count over said time interval;
   means for comparing said ingress PDU count and said egress PDU count and generating an error signal in case of a mismatch between said ingress PDU count and said egress PDU count;
   means for alarming said mismatch and specifying a type of datapath failure associated with said error signal; and
   a decision unit for comprising said egress PDU count with a threshold, and whenever said egress PDU count violates said threshold, identifying said ingress, PDU count corresponding to said ingress triggering said means for comparing, and using an additional threshold for distinguishing linecard resets from a datapath failure.

2. The apparatus of claim 1, wherein said means for comparing generates said error signal whenever said egress PDU count is zero and said ingress PDU count is non-zero.

3. The apparatus of claim 1, wherein said decision unit uses a plurality of thresholds, each corresponding to a particular mode of operation of said node.

4. The apparatus of claim 1, wherein said decision unit uses an additional threshold for distinguishing congestion from a datapath failure.

5. The apparatus of claim 1, wherein said means for comparing generates a specific error signal whenever said egress PDU count violates a specified threshold.

6. The apparatus of claim 5, wherein said means for alarming associates a specific datapath fault message to each said specific error signal, identifying the datapath fault that originated said specific error signal.

7. The apparatus of claim 1, further comprising a datapath failure type recognition unit for receiving said error signal and providing to said means for alarming additional data pertinent to a mismatch between said egress PDU count and said ingress PDU count.

8. The apparatus of claim 1, further comprising a datapath failure type recognition unit for receiving said error signal, correlating said ingress PDU count with said egress PDU count and providing said means for alarming with diagnostic data indicating the type of datapath fault that resulted in violation of said threshold.

9. The apparatus of claim 1, further comprising a datapath failure type recognition unit for providing said alarm unit with diagnostic data indicating the type of datapath fault that resulted in violation of said threshold.

10. At a switching node of a communication network for cross-connecting a datapath from an ingress of a node to an egress of a node based on routing data in a cross-connect table, a traffic manager comprising:
  a means for determining an egress count including all egress traffic PDUs in said datapath counted at said egress of the node over a period of time; and
  means for comparing said egress count with an ingress count and generating an error signal in the case of a mismatch between said ingress count and said egress count,
  wherein said ingress count includes all ingress traffic PDUs in said datapath counted at said ingress of the node over said period of time, and
  means for comparing said egress count with a threshold, and, whenever said egress count violates said threshold, identifying said ingress count corresponding to said ingress, triggering said means for comparing and said egress count with said ingress count, and using an additional threshold for distinguishing linecard resets from a datapath failure.

11. The traffic manager of claim 10, further comprising means for alarming said mismatch and associating a specific datapath fault message to said error signal for identifying a type of datapath fault that originated said error signal.

12. The traffic manager of claim 11, wherein said means for comparing generates a specific error signal whenever said egress count violates a specified threshold.

13. The traffic manager of claim 12, wherein said means for alarming associates a specific datapath fault message to each said specific error signal, identifying the datapath fault that originated said specific error signal.

14. The traffic manager of claim 11, wherein said means for comparing generates a specific error signal whenever said egress count violates a specified threshold.

15. The traffic manager of claim 14, wherein said means for alarming associates a specific datapath fault message to each said specific error signal, identifying the datapath fault that originated said specific error signal.

16. The traffic manager of claim 10, wherein said traffic manager further comprises means for resetting said ingress count and said egress count after said period of time.

17. The traffic manager of claim 10, wherein said means for comparing said egress count with a threshold uses a plurality of thresholds, each corresponding to a particular mode of operation of said node.

18. The traffic manager of claim 10, wherein said means for comparing said egress count with a threshold comprises means for triggering access to said cross-connect table for determining said ingress of the node associated to said egress of the node whenever said egress count violates said threshold.

19. The traffic manager of claim 10, wherein said ingress count is provided over a backplane interface whenever said ingress of the node and said egress of the node are on different linecards.

20. The traffic manager of claim 10, wherein said egress count is provided over a backplane interface whenever said ingress of the node and said egress of the node are on different linecards.

21. At a switching node of a communication network for cross-connecting a datapath from an ingress of the node to an egress of the node based on routing data in a cross-connect table, a traffic manager comprising:
  means for determining an ingress count including all ingress traffic PDU's in said datapath counted at said ingress of the node over a period of time; and
  means for comparing said ingress count with an egress count and generating an error signal in the case of a mismatch between said ingress count and means for comparing said egress count with a threshold, and, whenever said egress count violates said threshold, identifying said ingress count corresponding to said ingress, triggering said means for comparing said ingress count with said egress count, and using an additional threshold for distinguishing linecard resets from a datapath failure and said egress count,
  wherein said egress count includes all egress traffic PDUs in said datapath counted at said egress of the node over said period of time.

22. The traffic manager of claim 21, further comprising means for alarming said mismatch and associating a specific datapath fault message to said error signal for identifying a type of datapath fault that originated said error signal.

23. For a switched communication network that enables establishing a datapath over a switching node of said network, a method for silent datapath failure detection, comprising the steps of:
  at an ingress of the node associated with said datapath, collecting an ingress PDU count over a time interval;
  at an egress of the node associated with said datapath, collecting an egress PDU count over said time interval;
  identifying said ingress of the node associated with said egress of the node whenever said egress PDU count violates a threshold; and
  comparing said ingress PDU count with said egress PDU count and generating an error signal in case of a mismatch between said ingress PDU count and said egress PDU count comparing said egress PDU count with a threshold, and, whenever said egress PDU count violates said threshold, identifying said ingress PDU count corresponding to said ingress, triggering the step of comparing said ingress PDU count with said egress PDU count, and using an additional threshold for distinguishing linecard resets from a datapath failure.

24. The method of claim 23, further comprising resetting said ingress PDU count and said egress PDU count after said time interval.

25. The method of claim 23, further comprising alarming said particular mismatch and associating a specific datapath fault message to said error signal for identifying a type of datapath fault that originated said error signal.

26. The method of claim 23, wherein said PDU is one of an ATM cell, an Ethernet frame and a Frame Relay frame.

27. The method of claim 23, wherein said ingress PDU count and said egress PDU count are collected in a local memory on a linecard associated with said ingress of the node and said egress of the node, respectively.

28. The method of claim 27, further comprising associating a datapath alarm message to each said error signal, for identifying a respective type of datapath fault.

29. The method of claim 23, wherein said step of comparing includes:
   comparing said egress PDU count with a threshold,
   whenever said egress PDU count violates said threshold,
      identifying said ingress PDU count corresponding to said ingress of the node; and
      evaluating said ingress PDU count and said egress PDU count in the context of said error signal for identifying a type of datapath fault.

30. The method of claim 23, wherein said step of comparing comprises generating a specific error signal whenever said egress PDU count violates a specified threshold.

31. The method of claim 23, further comprising automatically triggering recovery of said datapath, in response to said error signal.

32. The method of claim 23, wherein said step of identifying comprises accessing a cross-connect table at said node for determining said ingress of the node corresponding to said egress of the node on said datapath.

33. The method of claim 23, wherein said threshold is established taking into account the bandwidth allocated to said datapath.

34. The method of claim 23, wherein said threshold is zero for alarming a datapath interruption.

35. The method of claim 23, wherein said step of identifying uses a plurality of thresholds, each corresponding to a type of allowable mismatch between said egress PDU count and said ingress PDU count.

36. The method of claim 35, wherein one of said thresholds is used for establishing if a datapath disruption occurred partway through said time interval.

37. The method of claim 35, wherein one of said thresholds is used for determining if said particular mismatch due to one of a linecard reset and creation of a new datapath.

38. The method of claim 35, wherein each said threshold is associated with a specified time interval for measuring said egress PDU count.

39. The method of claim 35, wherein one of said thresholds is used for determining corruption of one of said ingress and egress PDU count.

* * * * *